United States Patent [19]
Drewery

[11] Patent Number: 6,165,359
[45] Date of Patent: Dec. 26, 2000

[54] HIGH STRENGTH WASTEWATER TREATMENT SYSTEM

[75] Inventor: T. Gig Drewery, Lumberton, Tex.

[73] Assignee: Aqua Partners, Ltd., Lumberton, Tex.

[21] Appl. No.: 09/378,353

[22] Filed: Aug. 20, 1999

Related U.S. Application Data

[60] Provisional application No. 60/097,448, Aug. 21, 1998.

[51] Int. Cl.[7] .................................................. C02F 3/22
[52] U.S. Cl. .................................. 210/195.1; 210/195.3; 210/195.4; 210/197; 210/220; 210/256; 210/258
[58] Field of Search .............................. 210/195.1, 195.3, 210/195.4, 197, 202, 220, 256, 258, 259

[56] References Cited

U.S. PATENT DOCUMENTS

| | | | |
|---|---|---|---|
| 3,907,672 | 9/1975 | Milne | 210/195.4 |
| 4,093,549 | 6/1978 | Wilson | 210/197 |
| 4,104,167 | 8/1978 | Besik | 210/195.1 |
| 4,452,701 | 6/1984 | Garrett et al. | 210/220 |
| 4,929,349 | 5/1990 | Beckman | 210/220 |
| 4,933,076 | 6/1990 | Oshimn et al. | 210/195.1 |
| 4,950,396 | 8/1990 | Skane et al. | 210/195.3 |
| 4,983,285 | 1/1991 | Nolen | 210/197 |
| 5,032,276 | 7/1991 | Mackrle et al. | 210/195.3 |
| 5,217,609 | 6/1993 | Holdeman | 210/220 |
| 5,549,818 | 8/1996 | McGrew, Jr. | 210/256 |
| 5,630,936 | 5/1997 | Oyzboyd | 210/220 |
| 5,783,071 | 7/1998 | Guy | 210/256 |

*Primary Examiner*—Christopher Upton
*Attorney, Agent, or Firm*—Harrison & Egbert

[57] ABSTRACT

A high strength wastewater treatment system having a first tank with an inlet and an outlet, an aerator positioned within the first tank for passing oxygen into wastewater within the first tank, a second tank having a clarifier compartment positioned therein, an aeration device positioned in the second tank for passing oxygen into a liquid within the second tank, and a pipe connected to the first tank and the second tank for passing liquid from the second tank to the first tank. The second is interconnected to the outlet of the first tank. The second tank has an outlet extending from the clarifier compartment. In particular, the pipe has an end opening within the second tank and a diffuser connected to the pipe within the first tank. The diffuser is a venturi diffuser having a narrow section and a wide section. An air pump is connected to the venturi diffuser for injecting air into the narrow section. This delivery of air serves to draw liquid from the second tank through the pipe and into the first tank. The end of the pipe opens below the clarifier compartment in the second tank.

27 Claims, 9 Drawing Sheets

HIGH STRENGTH WASTEWATER TREATMENT SYSTEM

This application claims the benefit of provisional application Ser. No. 60/097,448, filed Aug. 21, 1998.

TECHNICAL FIELD

The present invention relates to wastewater treatment systems. More particularly, the present invention relates to extended aeration wastewater treatment systems. Furthermore, the present invention relates to such extended aeration wastewater treatment systems as used with high strength wastes with high BOD's.

BACKGROUND ART

Recently, home wastewater treatment systems have become increasingly popular. Prior to the development of home wastewater treatment systems, septic tanks were the conventional manner of cleaning home and small commercial establishment wastes from the water. In view of the great cost associated with connecting a home sewage system with the city sewage system, it is economically beneficial to employ the use of home wastewater treatment systems. Present home wastewater treatment systems are a downsized, underground version of the treatment processes employed by large central treatment plants.

Essentially, the treatment process correlates with an example found in nature. When a creek runs through rocks and over logs, turbulence is created and oxygen is captured. Aerobic bacteria utilize oxygen in their digestion processes. This allows the creek to purify itself. The home wastewater treatment systems simply employ a speeded-up version of this process in a manner known as "extended aeration". Air or oxygen is brought in by means of an efficient air pump and then diffused into thousands of tiny air bubbles by means of fine air diffusion. As these tiny bubbles move upward through the wastewater, oxygen is captured and the same purification process takes place. Such a system can allow normal household waste water to be reduced to a clear odorless liquid.

One such system has been manufactured and sold by Hydro-Action, Inc. of P.O. Box 12583, Beaumont, Tex. The system is known as the HYDRO-ACTION™ system. It is a self-contained automatic system. The HYDRO-ACTION™ system incorporates two separate compartments, each performing a specific function in the digestion process. First, raw waste water enters the aeration compartment and is mixed with activated sludge and aerated. An air pump injects large quantities of air into this compartment by means of porous ceramic diffusers located above the bottom perimeter of the aeration compartment. These diffusers create thousands of tiny air bubbles which provide oxygen for the aerobic digestion process and mixes the compartment's entire contents. These tiny bubbles provide better air-to-liquid contact so as to hasten the aerobic digestion process. Aerobic bacteria then use the oxygen in solution to break down the wastewater so as to convert the wastewater into an odorless liquid and gas. Hydraulic displacement causes the mixture to enter the second and final compartment. Due to the calm conditions and sloping walls of the clarification compartment, any remaining settleable material is encouraged to return to the aeration compartment for further treatment. The remaining effluent, upon reaching the outlet piping, is clear and odorless.

During a comprehensive eight month testing program, conducted by Baylor University, in accordance with the National Sanitation Foundation (NSF) Standard 40, the HYDRO-ACTION™ system produced an excellent effluent having a quality easily falling under the NSF Class I requirements of less than 30 PPM Bod (5 day) with greater than 85% reduction and less than 30 PPM TSS (Total Suspended Solids) with greater than 85% reduction. The actual HYDRO-ACTION™ test averages were 7.23 PPM Bod (5 day) with 96.04% reduction and 5.89 PPM TSS with 96.81% reduction. The HYDRO-ACTION™ system produced a clear and odorless effluent. Offensive, embarrasing wastewater odors, which are a common problem with septic tanks, are substantially eliminated by the HYDRO-ACTION™ system.

This HYDRO-ACTION™ system allows homes to be build on clay soil, rock or high water tables. This system also helps to protect the ground water supplies and eliminates gross pollution of ditches and streams. The effluent discharged from such a system is allowed by some state and local regulatory agencies to be discharged directly to a stream or pond or used to surface irrigate lawns and pastures. In areas where surface discharge is not allowed, subsurface disposal methods can be used with good success.

The use of the Hydro-Action™ system becomes more of a problem when high strength wastes are involved. Conventionally, high strength wastes are defined as those wastes which have a biological oxygen demand (BOD) of over 300. High strength wastes often occur from various commercial establishments. Typically, restaurants are a major source of such high strength wastes. The waste flow from a restaurant is five or six times stronger than the waste which passes from a home. When septic tanks were used, the septic tanks are designed relative to the flow rate and not by the biological oxygen demand. If the waste is to be passed subsurface, it is necessary to pretreat and reduce the strength of the waste before it is emitted into a drain field. At the soil interface, it will percolate into the soil. When the BOD is too great, a biological growth will occur on the soil. This biomat will plug the soil interface system.

When extended aeration systems are used for treating such high strength waste, the original systems were designed based upon only the flow rate. When the BOD is great, then the extended aeration system was not designed to dissolve the large quantities of oxygen required to treat such high strength waste. The result was that raw wastewater entered such an extended aeration system and resulted in raw wastewater flowing out of such system. There was simply not enough retention time to effectively treat the waste. A longer retention time is required so as to effectively treat such high BOD wastes.

As a result, a need has developed for the ability to treat such high strength wastes using extended aeration systems. Since such extended aeration systems are often manufactured in standard sizes, it is often difficult to build tanks that are of a sufficient size so as to allow for the suitable retention time of the wastes. Furthermore, it is sometimes difficult to incorporate clarifiers that have a suitable size for accommodating the flow rate from such commercial establishments. Whenever extended aeration systems are built, they must be shipped over public highways to the desired location. As such, the ability to ship becomes a major constraint on the use of such extended aeration systems for treating high strength wastes. The inability to properly dispose of such high strength wastes has become a major problem.

It is an object of the present invention to provide an extended aeration system which is suitable for the treatment of high strength wastes.

It is another object of the present invention to provide a wastewater treatment system which effectively provides suitable retention times for the treatment of high BOD waste.

It is another object of the present invention to provide a wastewater treatment system which is adaptable to the particular flow rates and expected BOD content of the wastes.

It is a further object of the present invention to provide a wastewater treatment system which can provide secondary clarification to the wastewater.

It is a further object of the present invention to provide a wastewater treatment system which is relatively easy to install, easy to use and relatively inexpensive.

It is still a further object of the present invention to provide a wastewater treatment system in which extended aeration tanks are of a suitable size for transport along public highways.

It is still another object of the present invention to provide a wastewater treatment system which avoids the need for septic tanks and municipal sewage line connections.

These and other objects and advantages of the present invention will become apparent from a reading of the attached specification and appended claims.

SUMMARY OF THE INVENTION

The present invention is a high strength wastewater treatment system comprising a first tank having an inlet and an outlet, an aeration means positioned within the first tank for passing oxygen into wastewater within the first tank, a second tank having a clarifier compartment therein and interconnected to the outlet of the first tank, an aeration means positioned within the second tank for passing oxygen into a liquid within the second tank, and a pipe connected to the first tank and to the second tank. The pipe opens to an exterior of the clarifier compartment in the second tank. The pipe serves to pass liquid from the second tank to the first tank.

In the preferred embodiment of the present invention, the pipe has an end opening within the second tank and a diffuser connected to the pipe within the first tank. The diffuser has an outlet within the first tank. This diffuser includes a venturi diffuser having a narrow section and a wide section and an air delivery means connected to the venturi diffuser for injecting air into the narrow section. The air delivery means serves to draw liquid from the second tank through the pipe and into the first tank. The end of the pipe opens below the clarifier compartment in the second tank.

The aerator means in the first tank includes a venturi diffuser having a narrow section and a wide section. The wide section opens adjacent to a bottom of the first tank. An air delivery means is connected to the venturi diffuser for injecting air into the narrow section. The venturi diffuser has an outlet on an opposite side of the narrow section from the wide section. The outlet of the first tank has an opening adjacent to the bottom of the first tank.

The aeration means of the second tank includes a first aerator positioned on one side of the clarifier compartment and a second aerator positioned on an opposite side of the clarifier compartment. Each of the first and second aerators comprises a venturi diffuser having a narrow section and a wide section with the wide section opening adjacent to a bottom of the second tank and an air delivery means connected to the venturi diffuser for injecting air into the narrow section. The venturi diffuser has an outlet on an opposite side of the narrow section from the wide section. In the present invention, the clarifier compartment is an inverted frustoconical chamber having a bottom opening adjacent to the bottom of the tank. In the preferred embodiment of the present invention, the chamber has a deflector affixed to an exterior of the chamber adjacent to the bottom opening.

In the present invention, the outlet of the second tank includes a tube extending from the clarifier compartment to an exterior of the second tank and a T-shaped inlet connected to the tube and extending downwardly into the clarifier compartment. The T-shaped inlet has a pair of opposed openings.

In one form of the present invention, a secondary clarifier is connected to the outlet of the second tank. This secondary clarifier comprises a chamber having an interior volume suitable for receiving a liquid from the outlet of the second tank, and a sludge removal means extending into the chamber so as to have an inlet adjacent a bottom of the chamber. The sludge removal means serves to pass sludge from a bottom of the chamber to a location exterior of the chamber. The outlet of the second tank includes a pipe extending from the second tank to an interior of the chamber. A downwardly extending tube is connected to this pipe within the interior of the chamber. The downwardly extending tube includes a first section having a diameter greater than the diameter of the pipe and an outlet connected to the first section on an end opposite the pipe. The outlet extends transverse to the first section. This outlet is a tube extending transverse to a longitudinal axis of the first section. The tube has a diameter no less than the diameter of the first section. The tube has a first opening on one end and a second opening at an opposite end. The outlet of the downwardly extending tube is positioned below the pipe within the chamber. The pipe has a T-shaped inlet extending downwardly into the chamber. This T-shaped inlet has openings at opposite ends thereof. The sludge removal means of the secondary clarifier includes a conduit extending downwardly into the chamber such that the inlet is adjacent a bottom of the chamber and an air delivery means connected to the conduit. This air delivery means serves to pass air into the conduit so as to cause sludge to pass from the chamber through the conduit and outwardly of the chamber. This conduit extends from the chamber so as to have an outlet in the first tank or in the second tank. The chamber is of an inverted frustoconical configuration. The bottom of this chamber is closed.

In the present invention, the first and second tanks, along with their associated inlets and outlets, can be interconnected to a series or sequence of other tanks so that the capacity for the removal of high BOD organic waste can be adapted to the expected effluent requirements of the commercial establishment. As such, a sequence of aerating tanks can be put together in such a manner so as to adapt the present invention for wastes of high BOD. Alternatively, sequencing of clarification chambers can be provided so that the system of the present invention can be adapted for effluent wastes of desired flow rates. Still further, and alternatively, the tanks and the clarifiers can be arranged and sequenced to treat wastes of high BOD and high flow rates.

DETAILED DESCRIPTION OF THE PRESENT INVENTION

Figure 1:
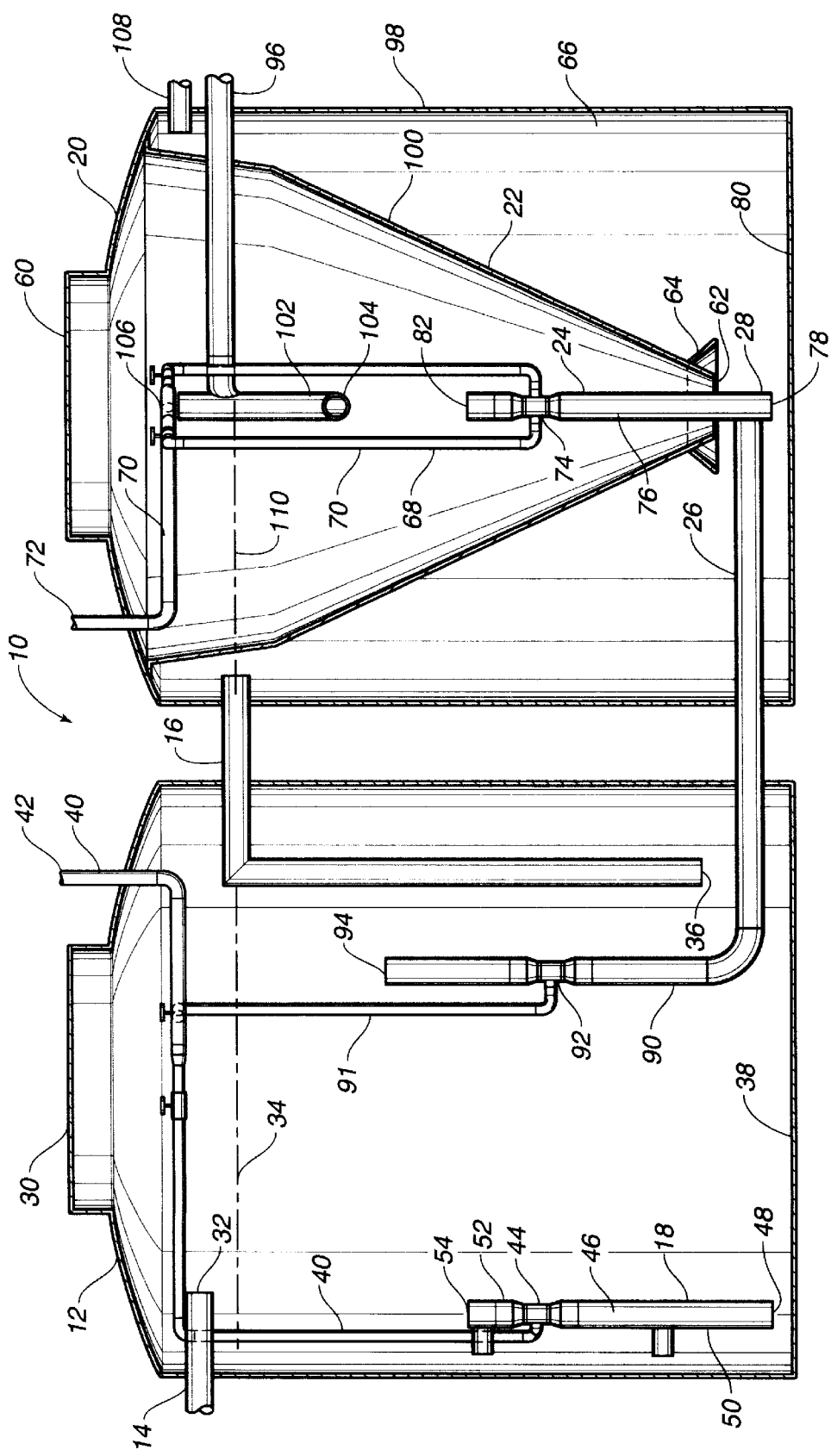
FIG. 1 is a side cross-sectional view showing the wastewater treatment system of the preferred embodiment of the present invention.

Referring to FIG. 1, there is shown at 10 the high strength wastewater treatment system in accordance with the present invention. The system 10 includes a first tank 12 having an inlet 14 and an outlet 16, an aerator 18 positioned within the first tank 12, a second tank 20 having a clarifier compartment 22 positioned therein, an aerator 24 positioned in the second tank 20, and a pipe 26 connected to the first tank 12 and to the second tank 20. The pipe 26 has an opening 28 exterior of the clarifier compartment 22 in the second tank 20. The pipe 26 serves to pass liquid from the second tank 20 to the first tank 12.

Referring to FIG. 1, it can be seen that the first tank 12 has a generally cylindrical shape with an access opening 30 on the top thereof. The first tank 12 is known as the "aeration tank". The tank 12 has an inlet 14 extending from a source of effluent so as to have an opening 32 on the interior of the tank 12. The broken line 34 shows, for example, the level of wastewater within the interior of tank 12. The outlet 16 extends through a wall of the tank 12 so as to have an opening 36 located at the bottom of the L-shaped outlet tube 16. Opening 36 generally faces the bottom 34 of the tank 12 and is located adjacent to the bottom of such a tank. The opening 36 of the outlet tube 16 should be placed sufficiently below the level of the wastewater 34 so as to prevent scum and floating particles from passing therethrough.

As can be seen in FIG. 1, the aerator 18 is known as a venturi diffuser. The aerator 18 is supplied with air through air pipeline 40. The pipeline 40 has an end 42 that can be suitably interconnected to an appropriate air pump apparatus. The air pump apparatus will pass compressed air through the air pipeline 40 until the air will exit the pipeline 40 into a narrow section 44 of the venturi diffuser 46. The venturi diffuser 46 has an opening 48 at the bottom thereof placed adjacent to the bottom 38 of tank 12. The opening 48 is along a wide section 50 of the venturi diffuser 46. The air enters the narrow section 44 of the venturi diffuser. The injection of air into the narrow section 44 creates a low pressure, high speed zone. After the air and the liquid pass from the narrow section 44, the mixed air and liquid enter a wide section 52 on the opposite side of the narrow section 44 from the wide section 50. When the mixed air and liquid enters the wide section 52, they enter a high pressure low speed zone which will create microbubbles. This effect is otherwise known as "cavitation". The microbubbles and liquid can exit the venturi diffuser 46 at outlet 54. This arrangement creates an enormous mixture of air and water within the wastewater 34 on the interior of tank 12. As such, the venturi diffuser 50 serves to infuse the wastewater 34 with high levels of oxygen.

The second tank 20 is another cylindrical tank of a generally similar configuration as tank 12. The second tank 20 has an access opening 60 at the top thereof Importantly, the tank 20 serves as a clarifier/aeration tank. Both the processes of aerating the wastewater and of clarifying the wastewater occur within the tank 20. Within the concept of the present invention, the aerated wastewater can be passed back into the interior of tank 12 by an arrangement of pipes and aerators.

It can be seen that the tank 20 has a clarifier compartment 22 affixed thereto. The clarifier compartment 22 extends downwardly into the tank 20 so as to have a narrow end 62 at the bottom and a wide end adjacent to the top 60 of the tank 20. This inverted-frustoconical configuration allows any particles in the wastewater in the clarifier compartment to settle out and drop through the opening 62 at the bottom of the clarifier compartment 22. The angled diverging walls of the clarifier 22 greatly reduce the velocity of the liquid within the interior of the clarifier compartment 22 so as to enhance the "dropping out" effect of suspended solids and other particles. A deflector 64 is positioned on the exterior of the clarifier compartment 22 adjacent to the bottom opening 62. The deflector 64 is in the form of a truncated cone so as to have a wide diameter end at the opening 62 and so as to diverge upwardly. Experimentation using the deflector 64 shows that the deflector cone 64 serves to deflect wastes in the aeration compartment 66 of the tank 20 from entering the opening 62. However, it is believed that the system 10 of the present invention will function properly if the deflector cone is not installed.

In FIG. 1, it can be seen that an aeration system 68 is provided in the aeration compartment 66 of tank 20. The aeration system 68 is located on the exterior of the clarifier compartment 22. An air pipeline 70 is connected at end 72 to a suitable air pump. The air pipeline 70 extends downwardly so that air is injected into the narrow section 74 of the venturi diffuser 76. The venturi diffuser 76 has a configuration similar to the venturi diffuser 50 of the first tank 12. The venturi diffuser 76 has a bottom opening 78 adjacent to the bottom 80 of tank 20. The venturi diffuser 76 has an outlet 82 at the end opposite opening 78. As such, the venturi diffuser 76 will act so as to "lift" any sludges on the bottom 80 of tank 20 upwardly into the aeration compartment 66. Additionally, the venturi diffuser 76 will serve to infuse large quantities of oxygen in the wastewater residing within the aeration compartment 66.

Importantly, in the present invention, the pipe 26 has an inlet 28 adjacent to the bottom opening 62 of the clarifier compartment 22. The pipe 26 extends from the second tank 20 into the first tank 12. The opposite end of the pipe 26 has a venturi diffuser 90 thereon. Air pipeline 91 is connected to pipeline 40 so as to allow air from the air pump associated with end 42 of air pipeline 40 to pass into the narrow section 92 of the venturi diffuser 90. The injection of air into the narrow section 92 essentially creates a pumping effect so as to draw any wastewater from the aeration compartment 66 of tank 20 through the venturi diffuser 90 and outwardly of the outlet 94 of the venturi diffuser. Since the inlet 28 of the pipe 26 is located below the bottom opening 62 of the clarifier compartment 22, any particles which drop out of the clarified wastewater in the clarifier compartment 22 will be "sucked" into the opening 28 on the pipe 26. As such, these particles are delivered back into the aeration tank 12 for further treatment. The venturi diffuser 90, along with its associated air lines, will also inject large amounts of oxygen into the wastewater 34 within the aeration tank 12.

It can be seen in FIG. 1 that the second tank 20 has an outlet 96 extending through the wall of the tank 20. The outlet 96 is a tube which extends through the wall 98 of tank 20 and through the wall 100 of the clarifier compartment 22. The outlet tube 96 has a T-shaped pipe 102 connected to the end thereof. This T-shaped tube 102 has an inlet 104. As will be described hereinafter, the T-shaped pipe 102 will have inlet openings 104 on opposite sides of the T-shaped pipe. Another opening 106 is located at an opposite end of the T-shaped pipe 102 so as to allow any gases passing through the opening 104 to be emitted therefrom. Gas outline line 108 extends above the level of the wastewater 110 in the tank 20 so as to allow any built-up gases to escape therethrough.

The present invention greatly facilitates the treatment of high strength wastes. As was stated under the "Background of the Invention", the treatment of high strength wastes requires additional retention time beyond that found for the treatment of household wastes. Typically, household wastes are retained between twenty-four and thirty hours with the HYDRO-ACTION™ system. However, at least sixty hours of retention time are required for the treatment of high strength waste. The combination of the aeration tank 12 and the clarifier/aeration tank 20 provides two and a half times the aeration capacity of conventional extended aeration wastewater treatment systems. The constant cycling of wastewater from one tank to the other allows the two tanks to be used in place of a single tank. As such, the tanks 12 and 20 can be more easily shipped than a larger tank. Additionally, these relatively smaller tanks are easier to manufacture, easier to install, and easier to equip and repair. The unique use of the diffuser arrangement greatly enhances the ability to oxygenate the wastewater within each of the tanks. The location of the pipe 26 adjacent the bottom opening 62 of the clarifier compartment 22 serves to draw any particles from the clarifier compartment 22 outwardly therefrom and to recycle such particles in the aeration tank 12. The suction provided by the arrangement of pipe 26 further enhances the ability of the clarifier compartment 22 to "drop out" any suspended wastes. The arrangement of venturi diffusers in the present invention serves to "lift" any sludge which accumulates at the bottoms 38 and 80 of tanks 12 and 20, respectively, for recirculation and mixing throughout the dissolved oxygen within the wastewater. As such, this arrangement of diffusers greatly enhances the treatment of such high strength wastes. This serves to eliminate any settlability problems.

Figure 2:
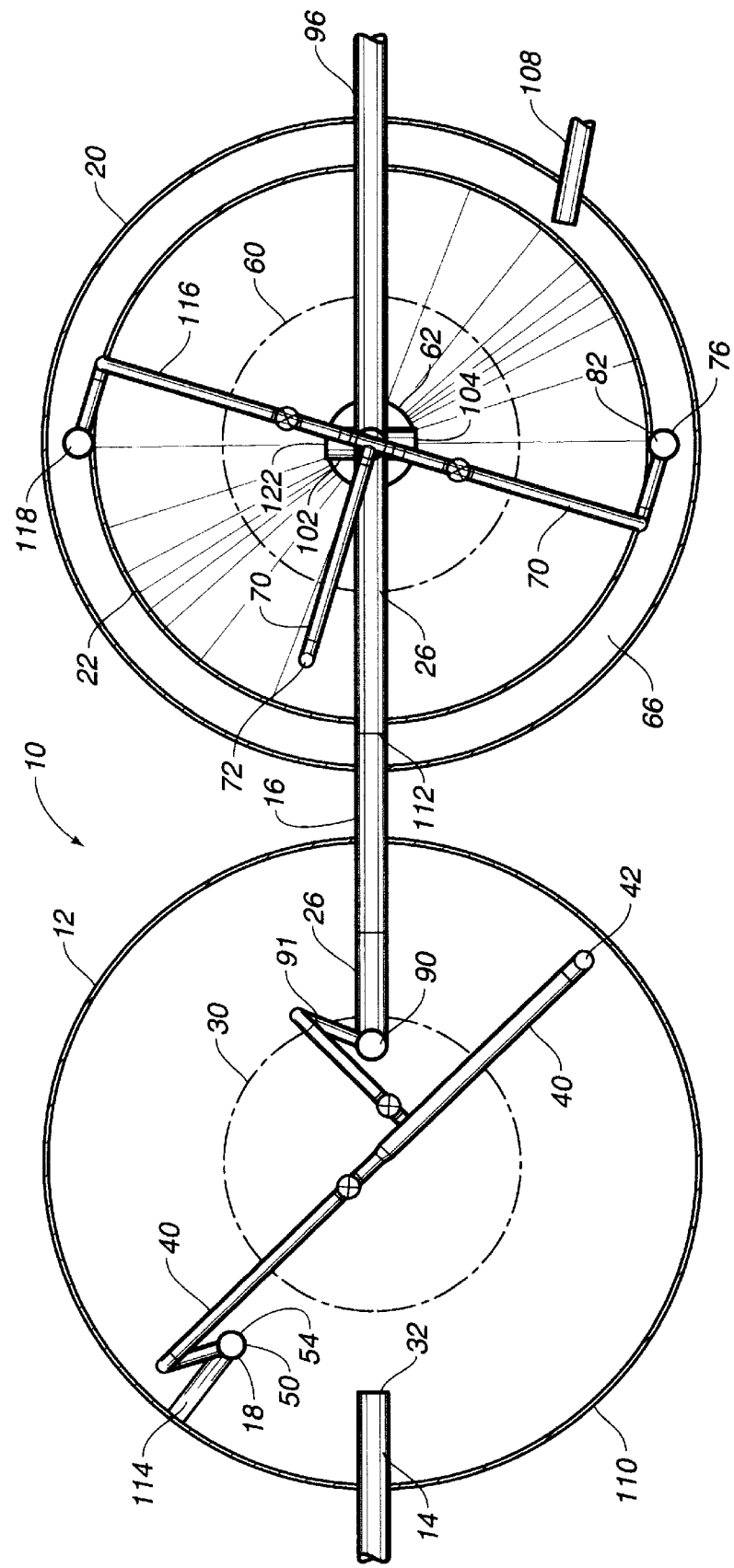
FIG. 2 is a plan cross-sectional view of the wastewater treatment system of the preferred embodiment of the present invention.

FIG. 2 shows a plan view of the system 10 of the present invention. Initially, it can be seen that the aeration tank 12 has a generally cylindrical configuration. Similarly, the access opening 30 has a circular opening. The inlet 14 extends through the wall 110 of the tank 12 so as to have an opening 32 in the interior of the tank 12. The outlet 16 extends from the interior of tank 12 so as to have an outlet 112 located within the aeration compartment 66 of the second tank 20. The aerator 18 is mounted by mounting bracket 114 to an interior wall of the tank 12. The venturi diffuser 50 extends upwardly in the tank 12 so as to have its outlet 54 located on top of the venturi diffuser 50. Air pipeline 40 extends so as to provide air for the functioning of the venturi diffuser. Additionally, air pipeline 40 also extends so as to supply air, through air pipeline 91, to the venturi diffuser 90 associated with the pipe 26.

The tank 20 is shown as having a generally cylindrical configuration. Similarly, the clarifier compartment 22 is shown as having a tapering configuration which extends downwardly to the bottom opening 62. The access opening 60 for tank 20 is shown in broken line fashion in FIG. 2. Air line 70 delivers air for the operation of the venturi diffuser 76. Air line 70 also connects to a branched air line 116 for delivery of air to another venturi diffuser 118 located on the opposite of the clarifier compartment 22. As can be seen, the venturi diffusers 76 and 118 are located on opposite sides of the clarifier compartment 22. Each of the venturi diffusers 76 and 118 is positioned within the aeration compartment 66 on the exterior of the clarifier compartment 22.

In FIG. 2, it can be seen that the outlet 96 extends through the wall of the tank 20 and through the wall of the clarifier compartment 22. The T-shaped pipe 102 is shown as branching outwardly so as to have opening 104 on one side and opening 122 on an opposite side. The horizontal configuration of this downwardly extending T-shaped pipe 102 serves as a barrier to the entrance by any small particles flowing upwardly in the clarifier compartment 22 through hydraulic displacement. Clarified wastewater is passed outwardly of tank 20 through the outlet 96 to a desired location. The air outlet tube 108 is shown as extending through the wall of the tank 20 so as to cause any built-up gases to pass outwardly of the tank 20.

Figure 3:
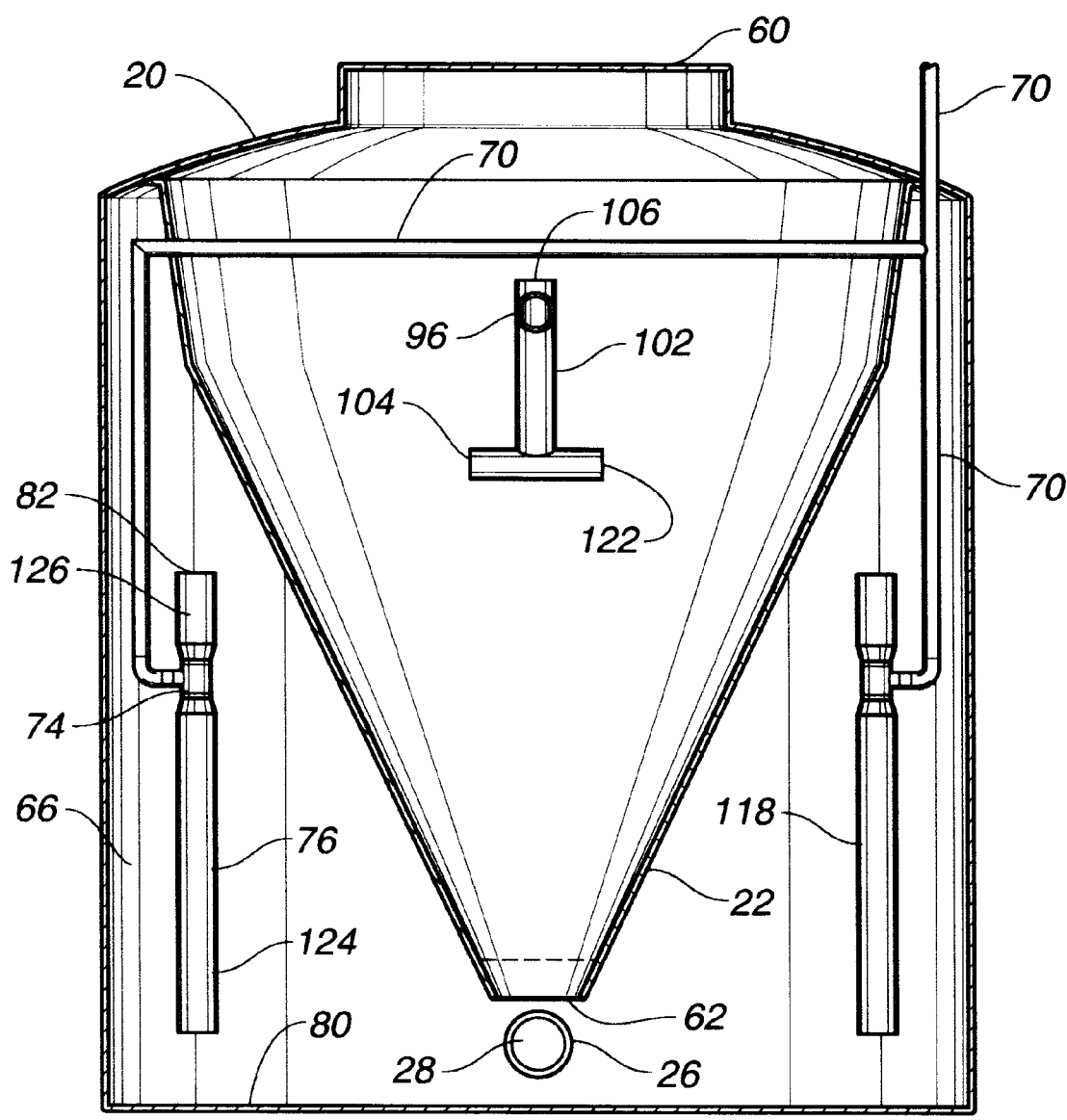
FIG. 3 is an end view of the secondary aeration/clarifier tank of the preferred embodiment of the present invention.

FIG. 3 shows an end view of the tank 20. As can be seen in FIG. 3, the tank 20 has access opening 60 on a top surface thereof. The air line 70 can be suitably connected to an air pump for the delivery of air therethrough. Air line 70 can extend through the interior of the tank 12 so as to be connected to the narrow section 74 of the venturi diffuser 76. As can be seen, the venturi diffuser 76 has a wide section 124. Additionally, the venturi diffuser 76 has another wide section 126 which communicates with the outlet 82. The movement of the liquid from the bottom 80 of tank 20 through the interior of the venturi diffuser 76 causes the liquid to enter a zone of low pressure (the narrow section 74) and then be emitted outwardly through the outlet 82 by way of a high pressure zone 126. This creates the requisite "microbubbles" for the mixing of dissolved oxygen with the liquid in the aeration compartment 66 of the tank 20. Another venturi diffuser 118 is also connected to air line 70. The other venturi diffuser 118 has a similar configuration to the venturi diffuser 76. Venturi diffuser 118 is located on the opposite side of the clarifier compartment 22 from the venturi diffuser 76. As can be seen, the pipe 26 has its inlet 28 positioned directly below the bottom opening 62 of the clarifier compartment 22. In FIG. 3, a variation of the present invention is shown in which the deflector cone 64 has been omitted.

FIG. 3 shows how the outlet pipe 96 has a downwardly extending T-shaped pipe 102 which includes openings 104 and 122 on opposite sides. A gas outlet 106 is formed on the top of this T-shaped pipe 102.

Figure 4:
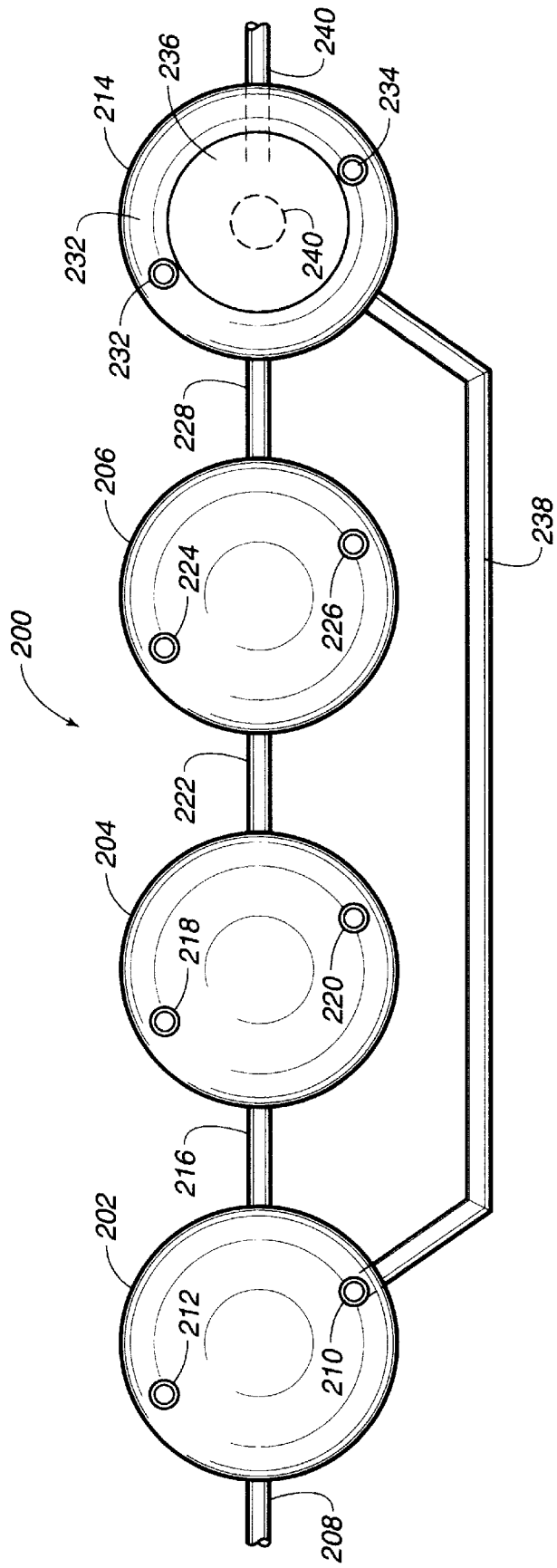
FIG. 4 is a plan view showing an arrangement of aeration tanks in series connected to a clarifier/aeration tank.

Importantly, in the present invention, the present invention can allow for an intermarriage of various aeration tanks and clarifier/aeration tanks. As such, the present invention allows itself to be adapted to the various BOD strengths of waste or the various flow rates of waste. As a result, the present invention allows conventionally sized extended aeration tanks to be interconnected for use in conjunction with flow rates exceeding 1,500 gallons per day. The present invention can be adapted, as required, so as to provide longer retention times for the treatment of wastes having a BOD in excess of 300 and up to 20,000. The adaption of the present invention simply requires the coupling of the various tanks together in a desired configuration for the treatment of such wastes. FIG. 4 shows one example in which the tanks can be interconnected for the treatment of relatively high BOD wastes.

Referring to FIG. 4, the system 200 is shown with particularity. System 200 is adapted for the treatment of high strength wastes having a BOD of greater than 300. Whenever high BOD waste is required to be treated, the amount of retention time is directly correlated to the BOD in the waste. As such, various aeration tanks 202, 204 and 206 can be interconnected together so as to enhance the retention time of the wastes. As can be seen in FIG. 4, the first tank 202 has an inlet 208 which causes the waste to enter the interior of tank 202. Aerators 210 and 212 are positioned within tank 202 for providing dissolved oxygen to the waste within the tank 202. Aerators 210 and 212 can have a similar configuration as the venturi diffusers described herein previously. As will be described hereinafter, the aerator 210 will be interconnected to the clarification/aeration tank 214 at the end of the process.

The effluent will pass from tank 202 through outlet 216 into the interior of tank 204. Tank 204 includes aerators 218 and 220. The aerated effluent in the tank 204 will pass therefrom through the outlet 222 into the interior of tank 206. Tank 206 includes aerators 224 and 226. The aerated effluent from the tank 206 will pass therefrom through outlet 228 into the aeration compartment 230 of the clarification/aeration tank 214. Aerators 232 and 234 are provided within the aeration compartment 230 of the clarification/aeration tank 214. Clarifier compartment 236 is provided on the interior of tank 214. A pipe 238 will extend from the bottom opening 240 of the clarifier compartment 236. Liquids from the aeration compartment 230 of the clarification/aeration tank 214 will be drawn through the pipe 238 to the aerator 210 in tank 202. As such, the wastes from the aeration compartment 230 of the tank 214 are recycled through the system in the manner described hereinbefore. The clarified effluent will pass from the clarifier compartment 236 outwardly of the clarification/aeration tank 214 through outlet 240. In the configuration shown in FIG. 4, the present invention can provide much more retention time than that described in the preferred embodiment of the present invention. Since all of the tanks 202, 204, 206 and 214 have a common size, they can be easily manufactured, transported, shipped and installed. As such, the present invention allows for a modular assembly of the aeration system. These various tanks enhance the retention time for the treatment of high BOD waste. The cycling of wastes from one tank to another assures that this retention time is achieved.

Figure 5:
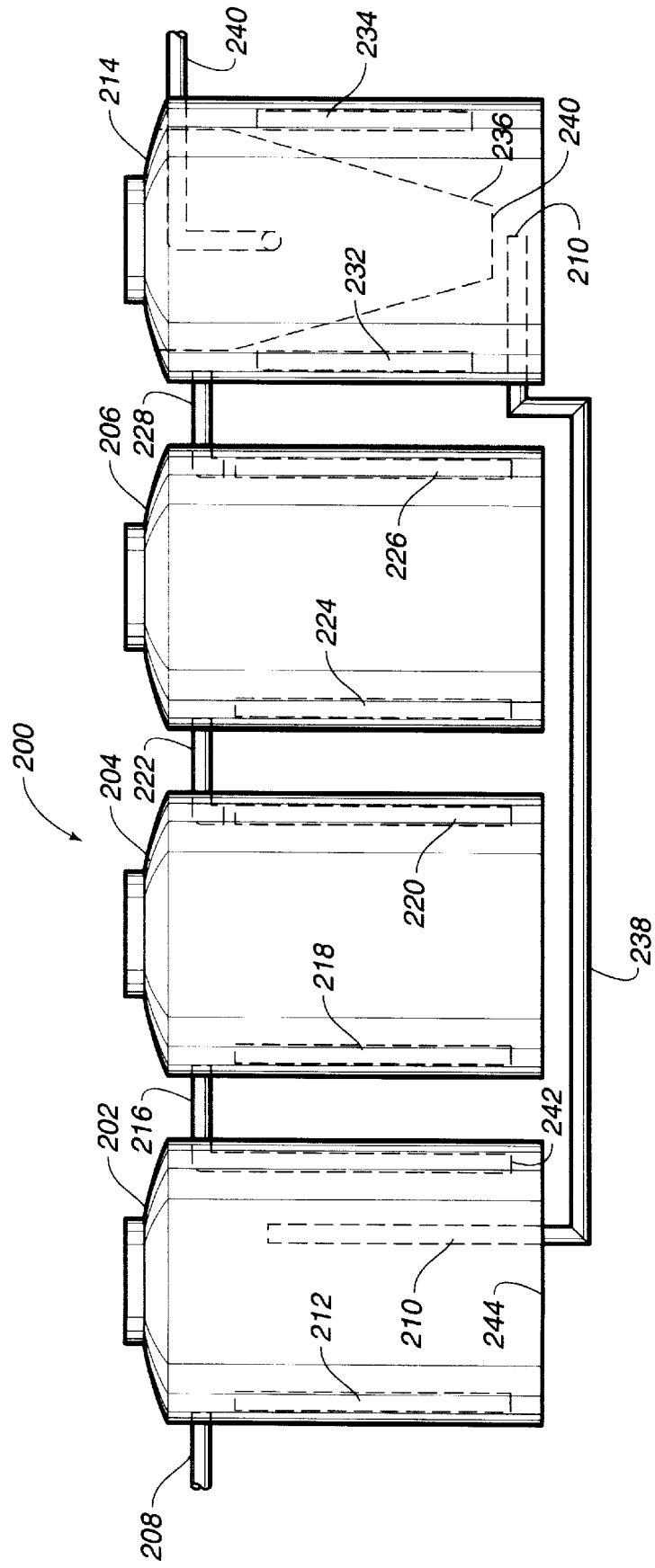
FIG. 5 is a side view of the arrangement of tanks of FIG. 4.

FIG. 5 is a side view of the system shown in FIG. 4. Each of the venturi diffusers is illustrated diagrammatically as located within each of the tanks 202, 204, 206 and 214. As can be seen in association with tank 202, the outlet 216 has an opening 242 located adjacent to the bottom 244 of tank 202. Each of the outlets 222 and 228 will have a similar configuration. The extension of each of the outlets 222 and 228 to the bottom of each of the tanks 204 and 206, respectively, has been omitted for clarity. It can be seen that the pipe 238 has an inlet 246 located just below the bottom opening 240 of the clarifier compartment 236 within tank 214. The outlet 240 extends downwardly into the clarifier compartment 236 in the manner described herein previously.

Figure 6:
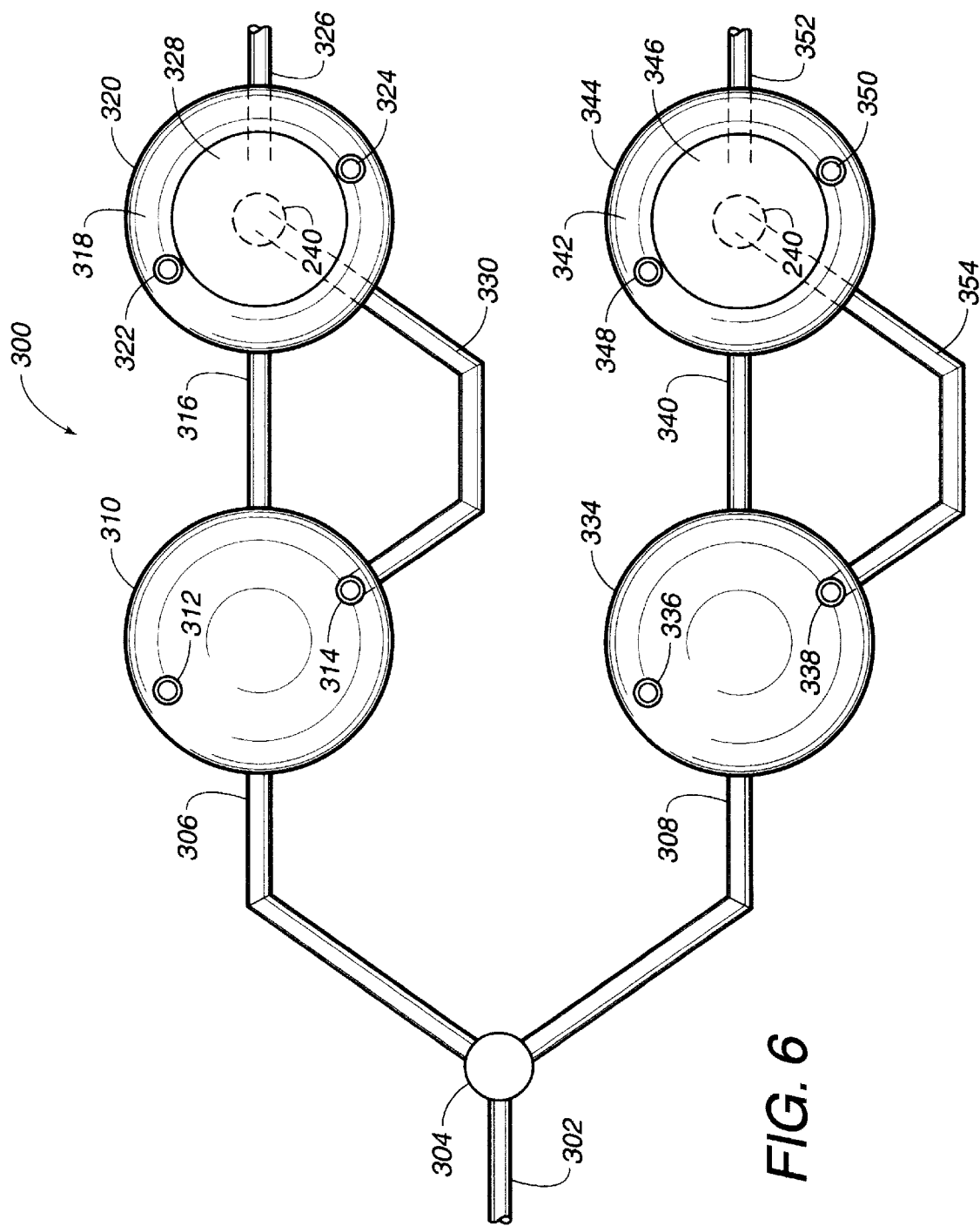
FIG. 6 is a plan view showing the system of the present invention arranged in parallel for the treatment of wastes from a single source.

FIG. 6 is an alternative form of the present invention for the treatment of high BOD wastes having a relatively high flow rate. As was described herein previously, the size of the clarifier compartment is related to the flow rate of effluent. If the flow rate of the effluent exceeds a certain rate per day, then the size of the clarifier compartment must be suitably enlarged to accommodate such a flow rate. Since the enlargement of the clarifier compartment can directly relate to the size of the wastewater treatment tank, the present invention facilitates the ability to expand the overall size of the clarification areas without exceeding the standard size of wastewater treatment tanks. In FIG. 6, a system 300 is illustrated with particularity. In the system 300, the high strength wastewater flows through pipe 302 so as to enter a splitter zone 304. As such, any wastewater within pipe 302 is transmitted to either pipe 306 or pipe 308. Pipe 306 extends to a tank 310. Tank 310 includes aerators 312 and 314. The outlet 316 of tank 310 extends, as an inlet to the aeration compartment 318 of tank 320. The aeration compartment 318 of tank 320 includes aerators 322 and 324. The outlet 326 of tank 320 extends into the clarifier compartment 328. As can be seen, a pipe 330 has one end opening at the bottom opening 332 of the clarifier compartment 328 and an opposite end communicating with the aerator 314.

The pipe 308 extends to the tank 334. Tank 334 includes aerators 336 and 338. The outlet 340 of tank 334 extends into the aeration compartment 342 of tank 344. A clarifier compartment 346 is provided within tank 344. The aeration compartment 342 of tank 344 includes aerators 348 and 350. Outlet 352 communicates with the clarifier compartment 346 so as to deliver clarified effluent outwardly of the clarifier compartment. A pipe 354 has one end opening at the bottom of the bottom opening 356 of the clarifier compartment 346. The pipe 354 communicates with the aerator 338 so as to draw any wastes from below the bottom opening 356 into the interior of the tank 334.

In the system 300 of the present invention, this dual arrangement of clarifier compartments 328 and 346 provides twice the clarification volume for the treatment of high flow rates of effluents. Additionally, the dual arrangement of aeration tanks 310 and 334 will provide twice the retention time for the wastes. As a result, the system 300 is available for treating high BOD wastes having relatively high flow rates.

Figure 7:
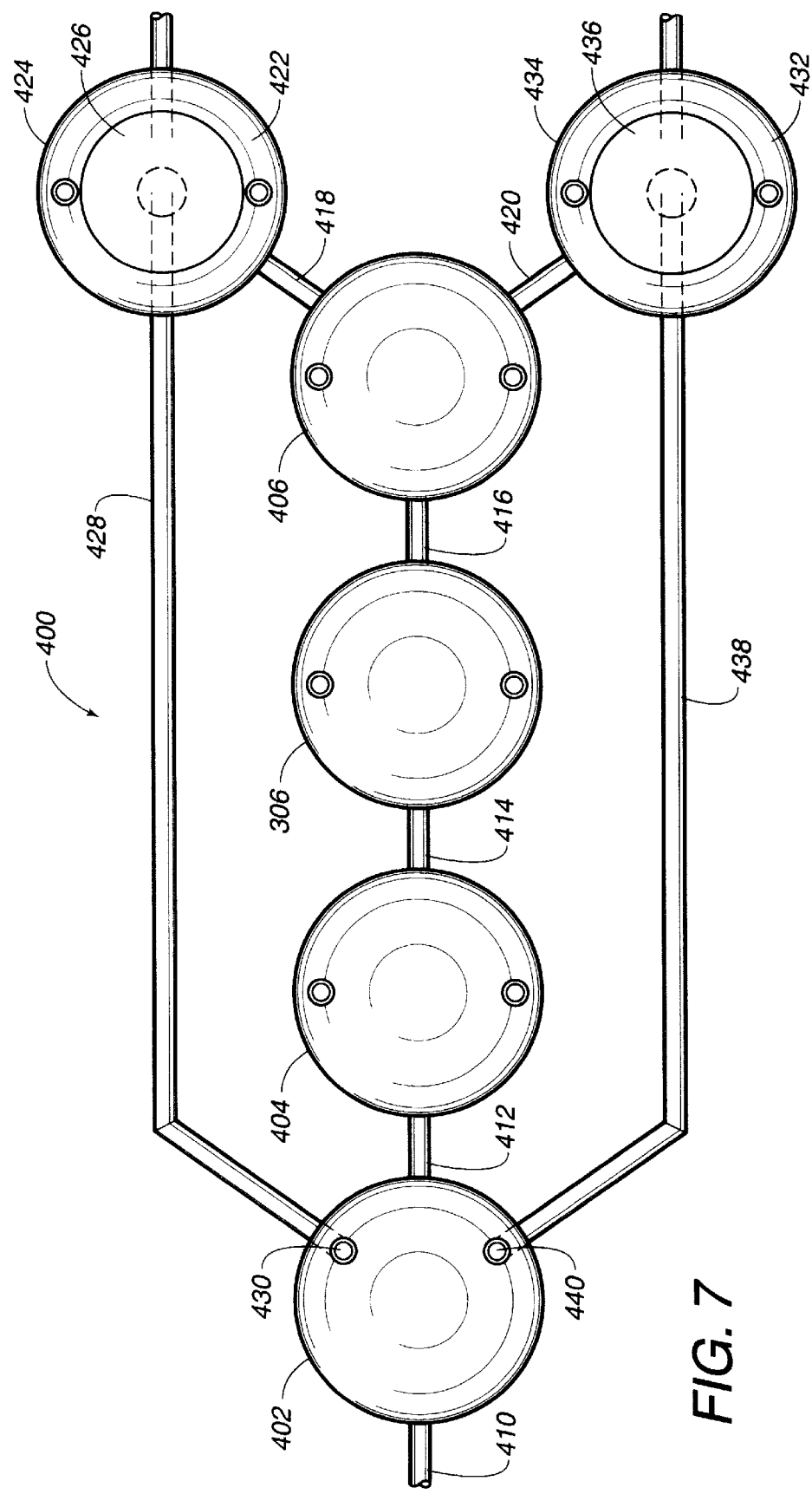
FIG. 7 shows an arrangement of aeration tanks and clarification/aeration chambers for the treatment of high volumes of high BOD waste.

FIG. 7 illustrates a system 400 in which very high strength waste with relatively high flow rates can be properly treated. As can be seen, the system 400 includes aeration tanks 402, 404, 406, and 408. Each of the tanks 402, 404, 406 and 408 are connected in series, as described hereinbefore. Initially, the high strength waste will flow through inlet 410 into the interior of tank 402. This high strength waste will flow continuously through the various outlets 412, 414 and 416 between each of the various tanks. The tank 408 includes first outlet 418 and second outlet 420. The first outlet 418 extends into the aeration compartment 422 of tank 424. A clarifier compartment 426 is provided on the interior of the tank 424. Pipe 428 will extend from the bottom opening of the clarifier compartment 426 back to the venturi diffuser 430 located on the interior of tank 402.

The second outlet 420 is connected to the aeration compartment 432 of tank 434. A clarifier compartment 436 is located on the interior of tank 434. Pipe 438 will extend from the bottom opening of the clarifier compartment 436 back to the venturi diffuser 440 of tank 402.

By the configuration shown by the system 400 of FIG. 7, a very large amount of retention time is provided by the series of four (4) aeration tanks 402, 404, 406 and 408. The relatively large (four inch) outlets 418 and 420 serve to pass accumulated effluent within the tank 408 evenly and consistently between the tanks 424 and 434. As such, the system 400 avoids the use of flow splitters. Such flow splitters can often become clogged, unusable or require frequent repair. The use of the two clarifier compartments 426 and 436 will allow for the treatment of effluents having relatively high flow rates. Each of the various tanks used in the system 400 is of a standard configuration. System 400 can be used with a relatively large facility without the need for custom manufacturing of the tank or the various components of the tanks. It is only necessary to assemble the tanks in a modular configuration.

Figure 8:
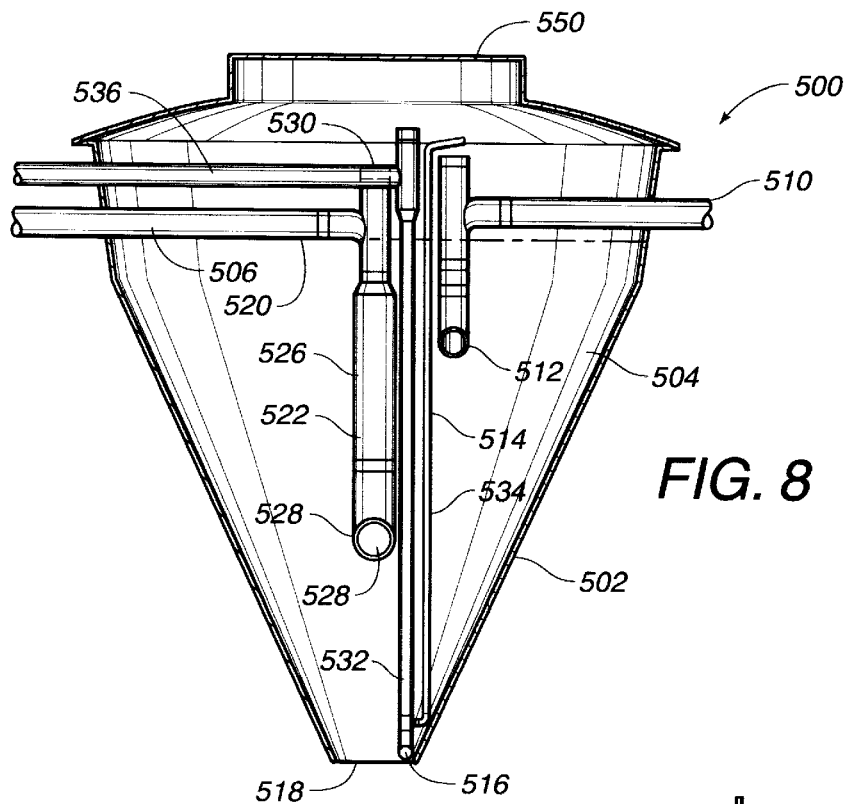
FIG. 8 is a cross-sectional view of the secondary clarifier in accordance with the teachings of the present invention.

FIG. 8 shows a secondary clarifier 500 of an alternative embodiment of the present invention. The secondary clarifier 500 can be connected to the clarifier/aeration tank for further clarification of the waste. As such, the secondary clarifier can be used so as to facilitate the ability to handle higher flow rates of wastes whenever the BOD content of the waste does not justify additional aeration capacity. The secondary clarifier 500 includes a chamber 502 having an interior volume 504 suitable for receiving a clarified liquid from the outlet of a connected clarifier/aeration tank. An inlet pipe 506 is provided. This pipe 506 extends from the outlet of such a clarification/aeration tank. The clarified waste from such a tank is passed through the pipe 506 so as to be delivered to the interior 504 through opening 508. An outlet pipe 510 has an opening 512 within the interior 504 of chamber 502. The outlet pipe 510 extends outwardly through a wall of the chamber 502 for delivery exterior of the chamber 502. Importantly, the present invention includes a sludge removal means 514 extending into the chamber 502 so as to have an inlet 516 adjacent to the bottom 518 of the chamber 502. The sludge removal means serves to cause sludge to pass from the bottom 518 of chamber 502 to a location exterior of the chamber.

In the present invention, the inlet pipe 506 has a particular and useful configuration. As can be seen in FIG. 8, the inlet pipe 506 has a pipe section 520 of a desired diameter extending from the exterior of the chamber 502 into the interior 504. A downwardly extending tube 522 is connected to the pipe section 520 within the interior 504 of chamber 502. This downwardly extending tube 522 has a section 526 having a diameter greater than the diameter of the pipe section 520. By expanding the diameter of section 526, the flow rate of clarified effluent greatly slows as it passes through the downwardly extending tube. The outlet 508 is connected to this section 526 on an end opposite the pipe section 520. The outlet 508 extends in a direction transverse to the first section 526. Outlet 508 is a tube which extends transverse to the longitudinal axis of the first section 526. The tube of the outlet 508 has a diameter no less than the diameter of the first section 526. The tube 528 associated with outlet 508 has an opening at opposite ends. Since each of the openings of the tube 528 have a diameter no less than the diameter of the first section 526, the flow rate through the downwardly extending tube 522 slows even further before such clarified effluent is emitted from the outlet 508. As such, the expanding of the various diameters of the inlet pipe 506 greatly slows flow rates so as to avoid any turbulence within the interior 504 of the clarifier compartment 502. The downwardly extending tube 522 has a T-shaped configuration with another gas outlet 530 located above the pipe section 520. The outlet 504 of the inlet pipe 506 is located below the inlet 520 of the outlet pipe 510.

Importantly, the present invention has a closed bottom 518 at the bottom of the frustoconical shaped chamber 502. The sludge removal means 514 serves to remove any accumulated sludge from the bottom 518. This sludge removal means 514 can be connected to a suitable timer so that periodic removal of sludge is achieved.

In the present invention, the removal of sludge is carried out by installing a conduit 532 to the interior of the chamber 502 such that the inlet 516 resides adjacent to the bottom 518. So as to "lift" the sludge, an air line 534 is connected to the conduit 532 above the inlet 516. When air is injected into the air line 534 and into the conduit 532, the upward flow of air will create a suitable "suction" so as to cause any sludge on the bottom 513 to pass through conduit 518 and move through line 536 so as to exit the chamber 502. Line 536 can be suitably connected, as described hereinbefore, to the first aeration tank of the wastewater treatment system or to the aeration compartment within the clarifier/aeration tank as described hereinbefore.

Figure 9:
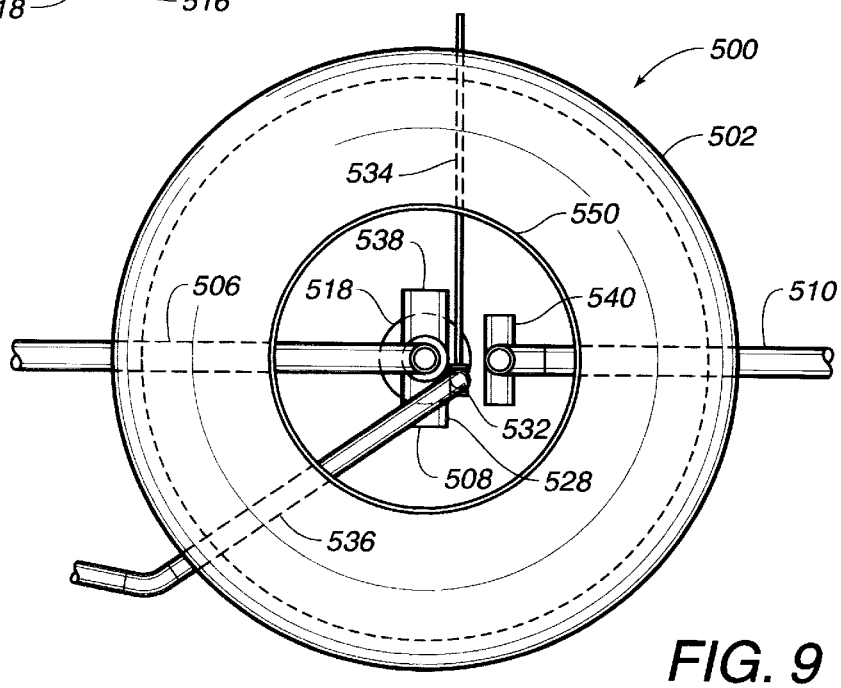
FIG. 9 is a plan view of the secondary clarifier of FIG. 8.

FIG. 9 shows the plan view of the system 500. Initially, it can be seen that the inlet pipe 506 will extend to the downwardly-extending T-shaped tube 522. The bottom tube 528 is illustrated as having outlets 508 and 538 on opposite ends thereof. The outlet 510 is also shown as having a T-shaped pipe 540 at one end thereof. The openings of the T-shaped pipe 540 are located at opposite ends thereof. Air line 534 will extend so as to connect to the conduit 532. The outlet line 536 allows any sludges to pass from the bottom 518 of chamber 502. FIG. 9 also shows the location of the access cover 550 at the top of the chamber 502.

Figure 10:
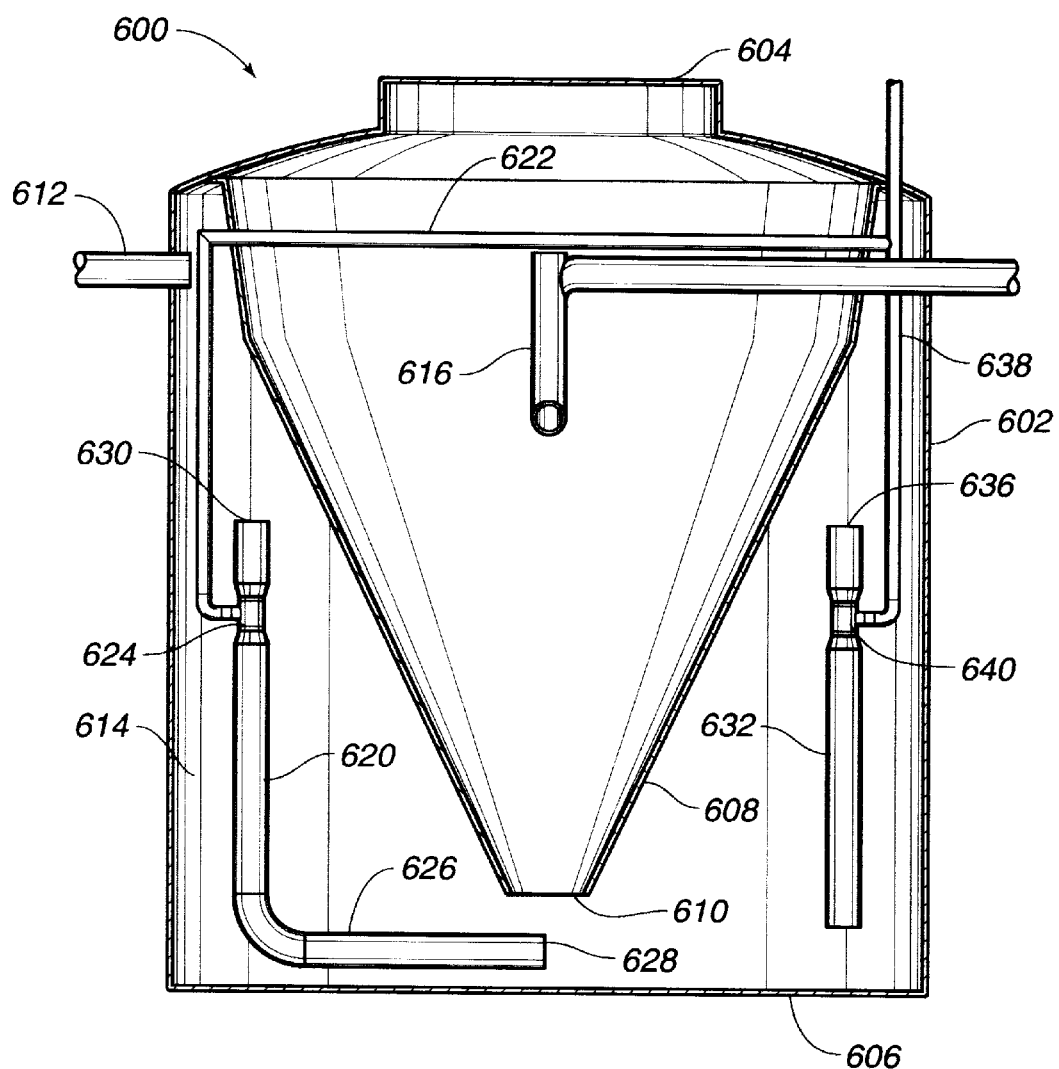
FIG. 10 is a cross-sectional view of a wastewater treatment system in accordance with an alternative form of the present invention.

There are certain circumstances in which the wastewater of low strength can be more effectively treated by using the system of the present invention. FIG. 10 shows an alternative embodiment 600 of the wastewater treatment system of the present invention. System 600 includes a tank 602 having an access cover 604 at a top thereof and a bottom 606 opposite the access cover 604. A clarifier compartment 608 is located on the interior of tank 602 and has a bottom opening 610 thereon. An inlet 612 extends into the aeration compartment 614 of tank 602. An outlet 616 (of a configuration similar to that described hereinbefore) extends into the interior of the clarifier compartment 608 and outwardly of the tank 602.

As can be seen in FIG. 10, the present invention utilizes a first aerator 620 located within the aeration compartment 614 of tank 602. The aerator 602 is a venturi diffuser which has an air line 622 extending so as to connect to a narrow section 624 of the venturi diffuser 620. A pipe 626 is positioned so as to have an inlet 628 located directly below the bottom opening 610 of the clarifier compartment 608. The venturi diffuser 620 operates in the same manner as described with the previous embodiments of the present invention. The air through the air line 622 will create a "suction" in the venturi diffuser 620 so as to draw any particles which have "dropped out" of the clarifier compartment 608 into the inlet 628 of pipe 626. The aerated sludge will be discharged through the outlet 630 of the venturi diffuser 620.

A second aerator 632 is located on the opposite side of the clarifier compartment 608. The aerator 632 has an inlet 634 adjacent to the bottom 606 of tank 602. The aerator 632 is a venturi diffuser that has an outlet 636 at the end opposite inlet 634. Air line 638 serves to pass air to the section 640 of the venturi diffuser 632.

The system 600 is similar to conventional wastewater treatment systems except for the fact that any waste sludge located on the bottom 606 of tank 602 is lifted upwardly into the aeration compartment 614. As such, any sludge which has accumulated on the bottom 606 of the tank 602 is more effectively "mixed" with the dissolved oxygen in the liquid within the tank. Additionally, the positioning of the inlet 628 of the aerator 620 directly below the bottom opening 610 of the A clarifier 608 more effectively removes any solids from below the bottom opening 610. The "suction" effect created by the venturi diffuser 620 will further assist the ability to "settle" solids from liquids within the clarifier compartment 608. The system 600 more effectively treats low strength low flow rate wastewater than comparable extended aeration treatment systems.

The foregoing disclosure and description of the invention is illustrative and explanatory thereof Various changes in the details of the illustrated construction may be made within the scope of the appended claims without departing from the true spirit of the invention. The present invention should only be limited by the following claims and their legal equivalents.

I claim:

1. A high strength wastewater treatment system comprising:
    a first tank having an inlet and an outlet;
    an aerator means positioned within said first tank, said aerator means for passing oxygen into a liquid within said first tank;
    a second tank having a clarifier compartment positioned therein, said second tank interconnected to said outlet of said first tank, said second tank having an outlet extending from said clarifier compartment;
    an aeration means positioned in said second tank, said aeration means for passing oxygen into a liquid within said second tank; and
    a pipe means connected to said first tank and to said second tank, said pipe means opening exterior of said clarifier compartment in said second tank, said pipe means for passing the liquid from said second tank to said first tank.

2. The system of claim 1, said pipe means comprising:
    a pipe having an end opening within said second tank; and
    a diffuser connected to said pipe within said first tank, said diffuser having an outlet within said first tank.

3. The system of claim 2, said diffuser comprising:
    a venturi diffuser having a narrow section and a wide section; and
    an air delivery means connected to said venturi diffuser for injecting air into said narrow section, said air delivery means for drawing liquid from said second tank through said pipe and into said first tank.

4. The system of claim 2, said end of said pipe opening below said clarifier compartment within said second tank.

5. The system of claim 1, said aeration means in said first tank comprising:
    a venturi diffuser having a narrow section and a wide section, said wide section opening adjacent a bottom of said first tank; and
    an air delivery means connected to said venturi diffuser for injecting air into said narrow section, said venturi diffuser having an outlet on an opposite side of said narrow section from said wide section.

6. The system of claim 1, said outlet of said first tank having an opening adjacent a bottom of said first tank.

7. The system of claim 1, said aeration means of second tank comprising:
    a first aerator positioned on one side of said clarifier compartment within said second tank; and
    a second aerator positioned on an opposite side of said clarifier compartment within said second tank.

8. The system of claim 7, each of said first and second aerators comprising:
    a venturi diffuser having a narrow section and a wide section, said wide section opening adjacent a bottom of said second tank; and
    an air delivery means connected to said venturi diffuser for injecting air into said narrow section, said venturi diffuser having an outlet on an opposite side of said narrow section from said wide section.

9. The system of claim 1, said clarifier compartment comprising an inverted frustoconical chamber having a bottom opening adjacent to a bottom of said second tank.

10. The system of claim 9, said chamber having a deflector affixed to an exterior of said chamber adjacent said bottom opening.

11. The system of claim 1, said outlet of said second tank comprising:
    a tube extending from said clarifier compartment to an exterior of said second tank; and
    a T-shaped inlet connected to said tube and extending downwardly into said clarifier compartment, said T-shaped inlet having a pair of opposed openings.

12. The system of claim 1, further comprising:
    a secondary clarifier connected to said outlet of said second tank.

13. The system of claim 12, said secondary clarifier comprising:
    a chamber having an interior volume suitable for receiving a liquid from said outlet of said second tank;
    a pipe having an opening within said chamber and extending exterior of said chamber; and
    sludge removal means extending into said chamber so as to have an inlet adjacent a bottom of said chamber, said sludge removal means for passing sludge from a bottom of said chamber to a location exterior of said chamber.

14. The system of claim 13, said outlet of said second tank comprising;
    a pipe of a desired diameter having one end opening within said clarifier compartment of second tank, said pipe extending from said second tank to an interior of said chamber; and
    a downwardly extending tube connected to said pipe within said interior of said chamber.

15. The system of claim 14, said downwardly extending tube comprising:
    a first section having a diameter greater than said desired diameter of said pipe; and
    an outlet connected to said first section on an end opposite pipe, said outlet extending transverse to said first section.

16. The system of claim 15, said outlet being a tube extending transverse to a longitudinal axis of said first section, said tube of said outlet connected to said end of said first section, said tube having a diameter no less than said diameter of said first section, said tube having a first opening at one end and a second opening at an opposite end.

17. The system of claim 15, said outlet of said downwardly extending tube positioned below said pipe in said chamber.

18. The system of claim 17, said pipe having a T-shaped inlet extending downwardly into said chamber, said T-shaped inlet having openings at opposite ends thereof.

19. The system of claim 13, said sludge removal means comprising:
    a conduit extending downwardly into chamber such that said inlet is adjacent a bottom of said chamber; and an air delivery means connected to said conduit, said air delivery means for passing air into said conduit so as to cause sludge to pass from said chamber through said conduit and outwardly of said chamber.

20. The system of claim 19, said conduit extending from said chamber so as to have an outlet in said first tank.

21. The system of claim 19, said conduit extending from said chamber so as to have an outlet in said second tank exterior of said clarifier compartment.

22. The system of claim 13, said chamber having an inverted frustoconical configuration, said bottom of said chamber being closed.

23. The system of claim 1, further comprising:
a third tank having an inlet and an outlet, said inlet of said third tank being connected to said outlet of said first tank, said outlet of said third tank being interconnected to said inlet of said second tank, said third tank having an aeration means positioned therein, said aeration means for passing oxygen into a liquid within said third tank.

24. The system of claim 1, further comprising:
a third tank having an inlet and an outlet, said inlet of said third tank being interconnected to said inlet of said first tank, said third tank having an aeration means positioned therein, said aeration means for passing oxygen into a liquid in said third compartment;
a fourth tank having a clarifier compartment positioned therein, said fourth tank having an inlet interconnected to said outlet of said third tank, said fourth tank having an outlet extending from said clarifier compartment, said fourth tank having an aeration means positioned therein exterior of said clarifier compartment, said aeration means of said fourth tank for passing oxygen into a liquid in said fourth tank; and
a pipe means connected to said fourth tank and to said third tank, said pipe means for passing a liquid from said fourth tank into said third tank.

25. The system of claim 1, further comprising:
a third tank having an inlet and an outlet, said inlet of said third tank being interconnected to said outlet of said first tank, said third tank having an aeration means positioned therein, said aeration means of said third tank for passing oxygen into a liquid in said third tank;
a fourth tank having a clarifier compartment positioned therein, said fourth tank having an inlet interconnected to an outlet of said third tank, said fourth tank having an outlet extending from said clarifier compartment, said fourth tank having an aeration means positioned therein exterior of said clarifier compartment, said aeration means for passing oxygen into a liquid in said fourth tank; and
a pipe means connected to said fourth tank and extending to said first tank, said pipe means for passing the liquid from said fourth tank to said first tank.

26. The system of claim 25, said third tank having a first outlet and a second outlet, said inlet of said fourth tank connected to said first outlet, said inlet of said second tank connected to said second outlet of said third tank.

27. The system of claim 25, further comprising:
a plurality of tanks connected in series between said first tank and said third tank.

* * * * *